United States Patent
Gerdes et al.

(10) Patent No.: US 10,776,326 B2
(45) Date of Patent: Sep. 15, 2020

(54) PERSONAL REAL TIME NAVIGATION MAP AUGMENTATION

(71) Applicants: Volkswagen AG, Wolfsburg (DE); Audi AG, Ingolstadt (DE)

(72) Inventors: Arati Gerdes, Sunnyvale, CA (US); Marco Antonio Lobato Fregoso, San Francisco, CA (US); Stefan Sellschopp, Palo Alto, CA (US); Mukta Ghalsasi, Menlo Park, CA (US)

(73) Assignees: Volkswage AG, Wolfsburg (DE); Audi AG, Ingolstadt (DE)

( * ) Notice: Subject to any disclaimer, the term of this patent is extended or adjusted under 35 U.S.C. 154(b) by 512 days.

(21) Appl. No.: 13/836,613

(22) Filed: Mar. 15, 2013

(65) Prior Publication Data

US 2014/0280355 A1 Sep. 18, 2014

(51) Int. Cl.
| G06F 16/9537 | (2019.01) |
| G01C 21/36 | (2006.01) |
| G06F 16/21 | (2019.01) |
| G01C 21/34 | (2006.01) |

(52) U.S. Cl.
CPC ......... *G06F 16/21* (2019.01); *G01C 21/3484* (2013.01); *G01C 21/3682* (2013.01); *G06F 16/9537* (2019.01)

(58) Field of Classification Search
CPC ............... G06F 17/30401; G06F 16/29; G06F 16/9535; G06F 16/9537; G01C 21/3667; G01C 21/3682
USPC ......................................................... 707/805
See application file for complete search history.

(56) References Cited

U.S. PATENT DOCUMENTS

| 6,401,034 | B1 | 6/2002 | Kaplan et al. | |
| 2010/0298050 | A1* | 11/2010 | Taraschuk | G09B 29/106 463/31 |
| 2011/0093846 | A1* | 4/2011 | Moinzadeh et al. | 717/178 |
| 2011/0141115 | A1* | 6/2011 | Brandes | G09B 29/007 345/428 |
| 2011/0295551 | A1* | 12/2011 | Rasanen | H04W 4/029 702/150 |
| 2012/0046861 | A1* | 2/2012 | Feldbauer | G09B 29/106 701/426 |
| 2012/0123667 | A1* | 5/2012 | Gueziec | G08G 1/096775 701/119 |
| 2013/0176328 | A1* | 7/2013 | Pillai | G09G 5/14 345/592 |

FOREIGN PATENT DOCUMENTS

| CA | 2 773 840 A1 | 4/2011 |
| WO | WO 2011/076989 S1 | 6/2011 |

OTHER PUBLICATIONS

Chinese Office Action for Chinese Application No. 201402317020 dated Feb. 23, 2017—English translation.

* cited by examiner

*Primary Examiner* — Marcin R Filipczyk

(74) *Attorney, Agent, or Firm* — Muncy, Geissler, Olds & Lowe, P.C.

(57) ABSTRACT

A system and method includes a central database storing personalized content of a user, a portal for accessing and manipulating the personalized content on the central database, and a vehicle navigation system configured to receive the personalized content from the central database and to display the personalized content on a map.

20 Claims, 4 Drawing Sheets

PERSONAL REAL TIME NAVIGATION MAP AUGMENTATION

BACKGROUND OF THE INVENTION

Field of the Invention

The present invention relates to vehicle navigation systems and more particularly to a method and system for real time personalization of vehicle navigation systems.

Description of the Background Art

Vehicle navigation maps typically display content from standard map databases and cannot, currently, easily be personalized to include content of specific personal interest to the user of a vehicle.

For example, in GoogleEarth, there are defined overlays a user can add to a map in a vehicle infotainment system (e.g., like Panoramio). Navigation systems sometimes offer the user a set of standard categories such as restaurants, hotels, gas stations, etc., which can be turned on or off for display on the map. For example, U.S. Pat. No. 6,401,034 discloses a navigation system that allows a user to specify a type of point of interest at which the user wishes to make an intermediate stop while on route to a final destination. The user selects a type of point of interest (e.g., restaurant, hotel, gas station, etc.) and the system defines a geographic search area defined relative to the current vehicle location and destination programmed into the navigation system. Based on the user-selected type of point of interest, the navigation system searches the defined geographic search area and identifies one or more points of interest of the type specified by the user located within the geographic search area.

Additionally, some navigation systems allow a user to manually enter a set of "favorite" addresses in the navigation system and store these "favorites" in an onboard address book.

In conventional navigation systems, the user typically either switches off the navigation system or switches to another screen (e.g., radio) when the navigation system is not in use. If the navigation system is used in this manner merely to navigate a user from point A to point B, then the navigation is of little value to the user when the user knows the driving route to the driver's destination.

Currently, no known navigation systems allow a user to easily personalize the vehicle navigation map in real time. Indeed, visualizing customizable status information on the map in real time has not been done for points of interest.

SUMMARY OF THE INVENTION

In view of the foregoing and other exemplary problems, drawbacks, and disadvantages of the conventional methods and structures, an exemplary feature of the method and system of the present invention is to provide a method and system that allows a user (e.g., vehicle driver/passenger) to easily personalize a vehicle navigation system map with content of personal interest to the user in real time. An easy way to incorporate different sources to an onboard system has never been accomplished in conventional systems. A complete onboard personalization would be too distracting. Accordingly, the present system (and method) enables personalization to be conducted off-board (e.g., on a PC/or mobile device), which makes the personalization easier and safer.

In accordance with a first exemplary, non-limiting aspect of the present invention, a system includes a central database storing personalized content of a user, a portal for accessing and manipulating the personalized content on the central database, and a vehicle navigation system configured to receive the personalized content from the central database and to display the personalized content on a map.

In accordance with a second exemplary, non-limiting aspect of the invention, a method includes sending a request, from a vehicle navigation system to a remote server, for personal content of a user and displaying the personal content on a display of the vehicle navigation system.

In accordance with a third exemplary, non-limiting aspect of the invention, a method includes entering personalized content into a user account in a central database, importing the personalized content from the central database to a vehicle navigation system, and displaying the personalized content on a map of the vehicle navigation system.

The present invention provides a portal based solution that enables a user to add personalized content to a vehicle navigation system. The user is able to import existing keyhole markup language (KML) layers or other geo referenced information into an account in an original equipment manager (OEM)/corporate portal, which are then accessible in a navigation system in a user's vehicle (or vehicles). Further sources of content including, but not limited to, geo-tagged pictures, social networks, real time information about the availability of charging stations, real time gas prices, parking information or other applications, may also be added to the account for use with the navigation system.

Furthermore, the invention allows the user to see real time information, which is relevant to the user on the screen while not displaying information that is not relevant to the user, thus reducing distraction. The invention also makes the navigation system and map more relevant by providing information to the driver, which is relevant even if the driver does not presently need the route guidance feature of the navigation system. Additionally, the user is able to choose context relevant parameters (e.g., geo-fencing of friends locations) for the different services and content types.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, do not limit the present invention, and wherein.

DETAILED DESCRIPTION

Figure 1:
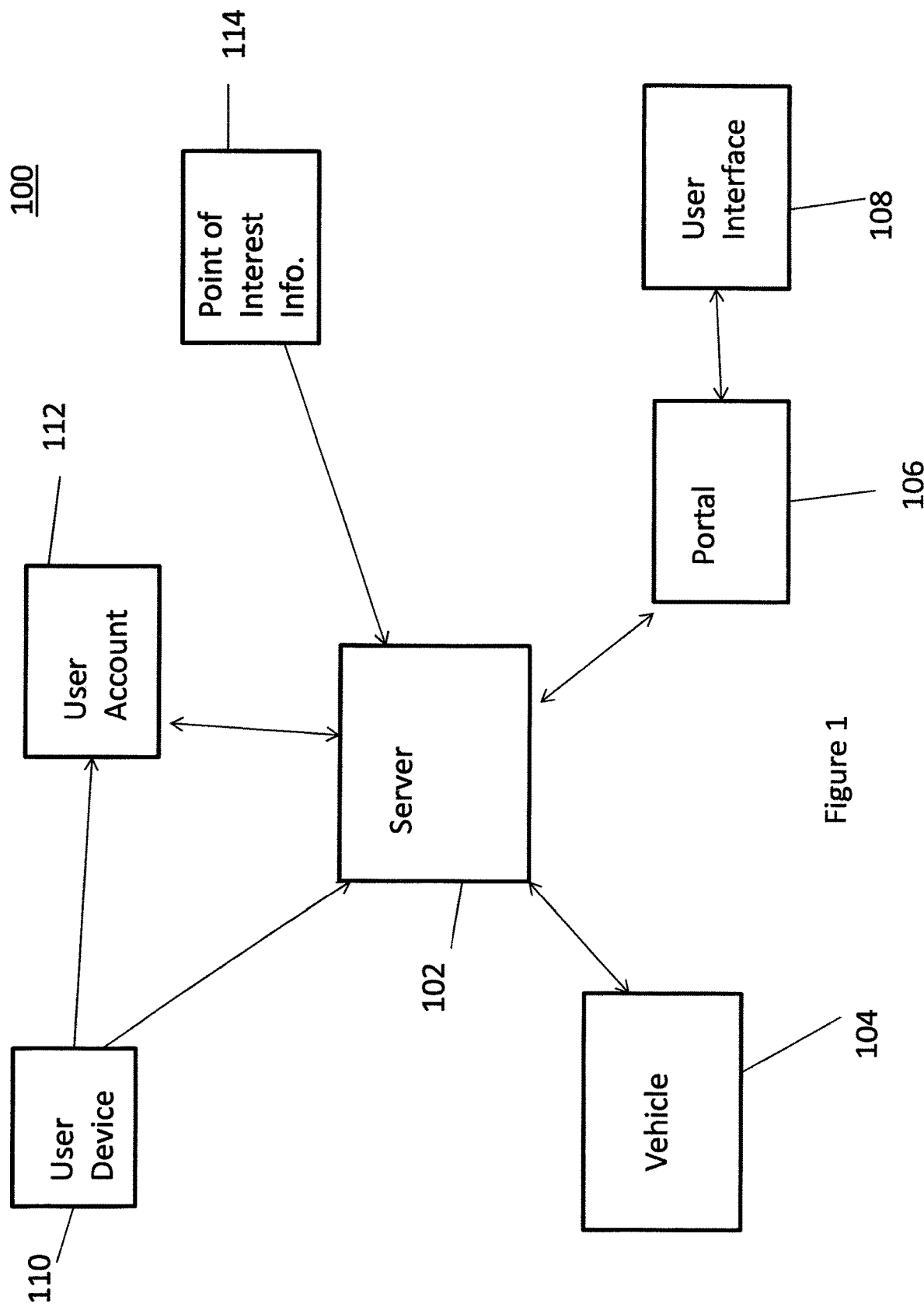
FIG. 1 illustrates a system 100 according to certain exemplary embodiments of the present invention.

Referring now to the drawings, and more particularly to FIGS. 1-4, there are shown exemplary embodiments of the method and structures according to the present invention.

According to certain exemplary embodiments, the invention includes a system 100 as is illustrated in FIG. 1. The system 100 includes a central server 102 including a central database. In the embodiment illustrated in FIG. 1, the server 102 is remote from a user vehicle 104. For example, the server 102 may include an original equipment manager (OEM) server or corporate server, with which the user may interact. The user is able to interact with the server 102 through a portal 106, on which the user may have one or more accounts. The portal may include a web-based user interface (e.g., website), which the user may access using a user device 108. The user device 108 may include a computer or other web-enabled device (e.g., cellular telephone, laptop computer, tablet, etc.).

The system 100 also includes a user server interface 110, which may include a cellular phone (or other wireless device) or a digital camera, through which the user may upload, for example, pictures onto the server. Furthermore, the user may login to an account 112, such as Flickr, Facebook, Google MyMaps, Foursquare, etc., to upload pictures to the account. The content of the account 112 may be synchronized with the server 102. Specifically, the user may define certain accounts or certain content within certain accounts, which may be synchronized with the server 102. Generally speaking, point of interest information 114 may be imported to the server linked to the user's profile. The import would usually happen also from a personalized account of a point of interest (POI) service (like YELP). For example, the point of interest information could include information regarding vehicle fueling/charging stations, such as their location and status.

The exemplary system illustrated in FIG. 1 enables a portal based solution, which allows a user (e.g., vehicle driver, vehicle passenger) to add additional, personalized content to a vehicle navigation system. The user is able to import existing KML layers to the one or more accounts in the portal 106, which are then usable in the vehicle 104 through interfacing with the server 102. Additionally, further sources of content may be added. For example, geo-tagged pictures, content from social networks, new applications, etc. may be added through the portal 106 or by synchronizing with user accounts/social network accounts 112. Additionally, real time information regarding points of interest 114 may be added.

The user information provided to the server 102 may then be displayed on the map of the navigation system in the vehicle 104. For example, it may be displayed as an overlay on the navigation system map. User content for the content layers on the personalized map may be created in several ways.

That is, a user can send geo-tagged pictures from a user device 110 to the web-based portal using an application on the user device that communicates with the portal 106. Furthermore, a user can enter addresses on the user device 110 using services available on the user device 110 including, but not limited to, text- or voice-based address searches, selecting a location on a map, text- or voice-based point of interest (POI) searches, and image-based searches for a location. The application on the user device 110 sends the resulting location and accompanying content/information to the portal 106. Additionally, a user can include personalized content for the map using content created either by the user or by others on third-party network services 112. The portal 106 can connect to the user accounts on the network services 112 to allow the user to import personalized content to the navigation map in the vehicle 104. The user account credentials are stored in the server and provided to the portal and linked to the other service providers as needed for each service. The user credentials and accounts will differ for the third party services, which have their own login.

The personalized content can include, but is not limited to, pictures, points of interest, routes/paths (e.g., bicycle trails, walking trails), shape overlays, 3d models, locations of people, and any real time information that can be displayed on the navigation map. Furthermore, the personalized content can be any visual or interactive elements on the map and may be dynamic and state specific. Using the portal 106, the user can create personalized content on the portal website directly. Additionally, using location-based browser services, the user can have geo-referenced, high-quality, personalized information displayed through the navigation system.

The portal 106 is configured to maintain the personal content in the form of distinct sets (i.e., layers) of content in one or more user accounts on the portal 106. A user can create multiple layers of personal content.

Figure 2:
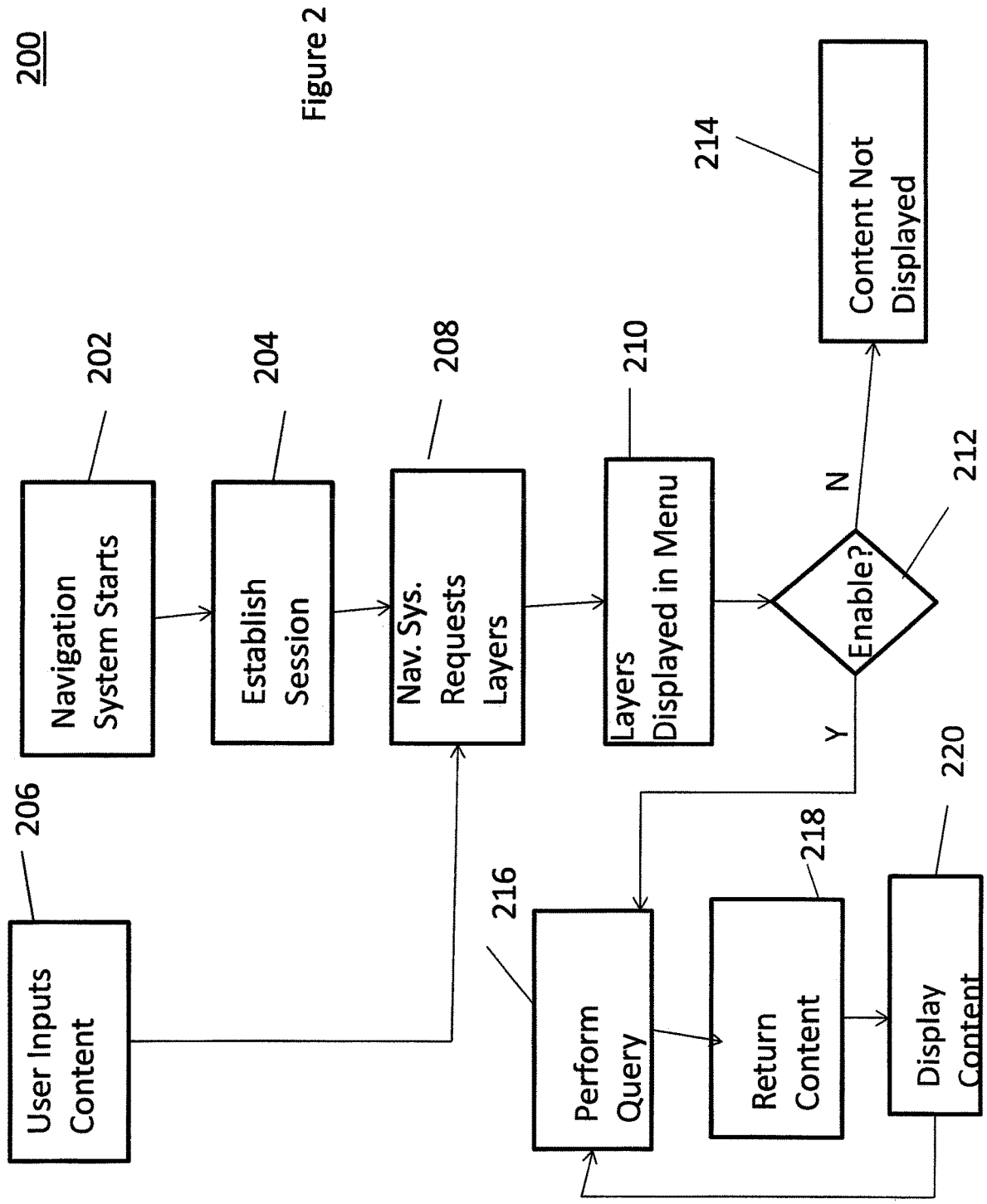
FIG. 2 illustrates a method 200 according to certain exemplary embodiments of the present invention.

FIG. 2 illustrates a method 200 according to certain exemplary embodiments of the invention. When the navigation system on the vehicle 104 starts (202), a session is established (e.g., automatically) with the user (204). The content for the user (208) is requested. As described above, the personal content or available layers are input by the user through, for example, the portal (206). A list of the layers of content are then displayed to the user in a menu (210) and the user is offered the option to enable or disable the display of the content within the map display (212). If a layer of personal content is disabled by the user, then the content is not displayed in the navigation system (214). If a layer of personal content is enabled by the user, then the vehicle navigation map application will perform periodic queries to the server in order to request the content of the personalized content set (216).

The periodic queries could include generating a bounding box indicating an area of interest for the content. The bounding box could include, but is not limited to, a bounding box representing the visible map area on the navigation system display screen, or a bounding box representing the route from the current location to the destination, or a radial area around the queried position or an increasing radial area until a desired number of results have been found.

Once the query is complete, the content is returned to the navigation system (218), which displays the content to the user (220). The queries may be repeated when needed or defined by the user or system.

Figure 3:
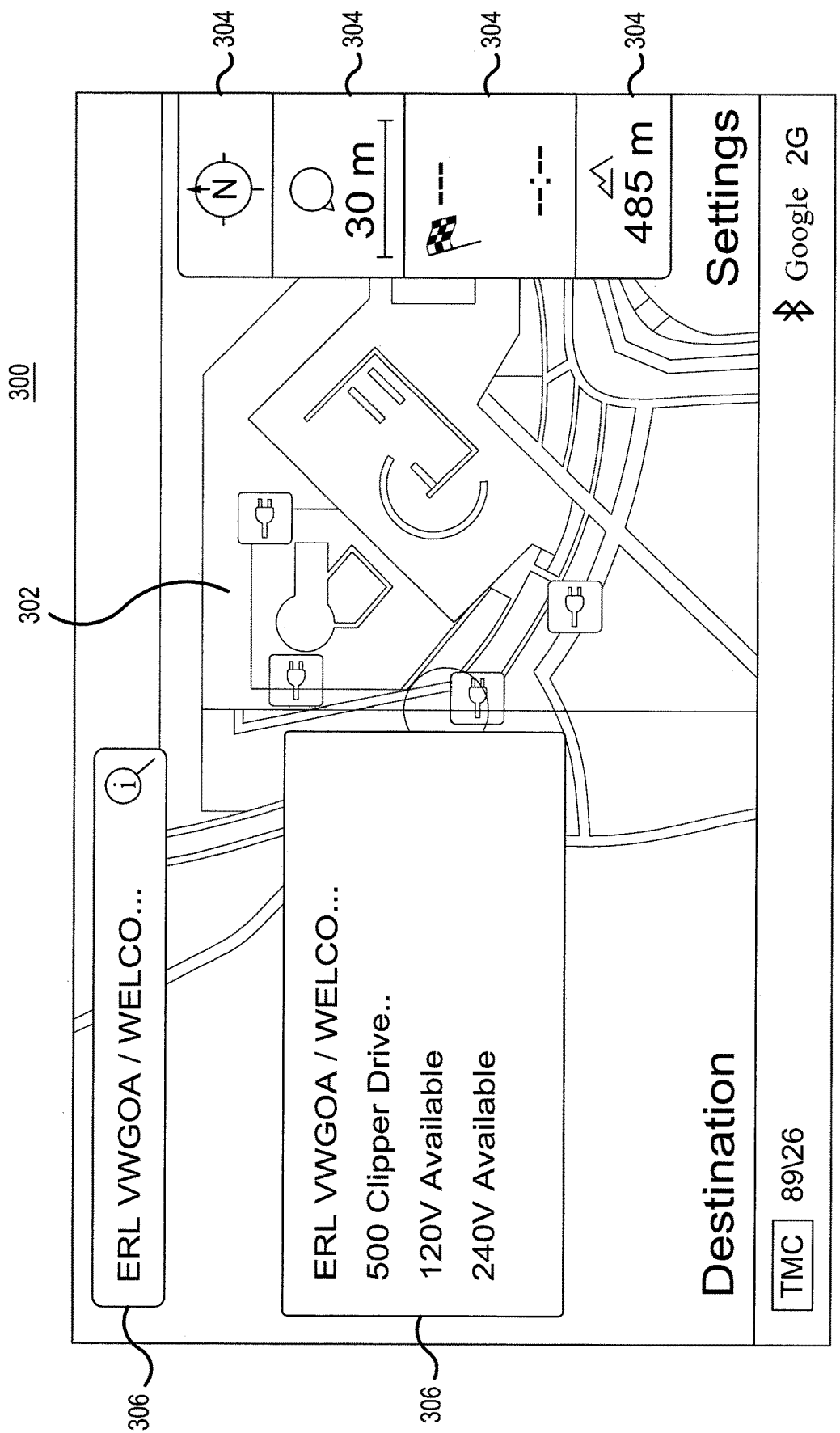
FIG. 3 illustrates an exemplary navigation display screen 300.

FIG. 3 illustrates an exemplary map display 300 of a vehicle navigation system according to certain exemplary embodiments of the present system. The map display 300 includes a typical navigation system map 302. Typical route guidance information 304 is displayed on the map. Additionally, the map display 300 may include one or more regions 306 for displaying personalized user content. In the example illustrated in FIG. 3, the personalized user content includes an overlay of information regarding a vehicle fueling/charging station on a GoogleEarth map provided on the map of the navigation system. The regions 306 show specific information about the fueling/charging station. The regions 306 are interactive and may be enabled/disabled by the user.

The server 102 is configured to maintain different levels of detail for the content of the personalized layer, depending upon the size of the visible area on the screen as reported in the request from the map application. The server 102 is configured to ensure that content at the appropriate level of detail is returned to the map, depending on the visible area of the screen. The navigation system map application is configured to perform a new query when needed or defined (e.g., view or zoom level is changed) and can request the server to return user elements (e.g., all user elements) for the bounding box or to return only the elements that have not already been sent to the map application in response to a previous query in session, which allows for optimized bandwidth use.

Using the portal 106, the user is able to send destinations to the vehicle navigation system. The destinations can be input manually or sent through the user account. After finding a location, the location can be sent to the user account (or mobile device or e-mail account). Then, the user can access the address in the portal 106 (or download it to the navigation system in the vehicle 104). The user can manipulate the destinations in the account. Additionally, one or more vehicles may be assigned to an account (or multiple accounts) in the server 102. The user can assign the destinations (or other personalized content) to all of the vehicles or select individual accounts or vehicles. In the same way, for each vehicle or individual vehicles, the user could add objects with additional information (e.g., different KML layers).

Figure 4:
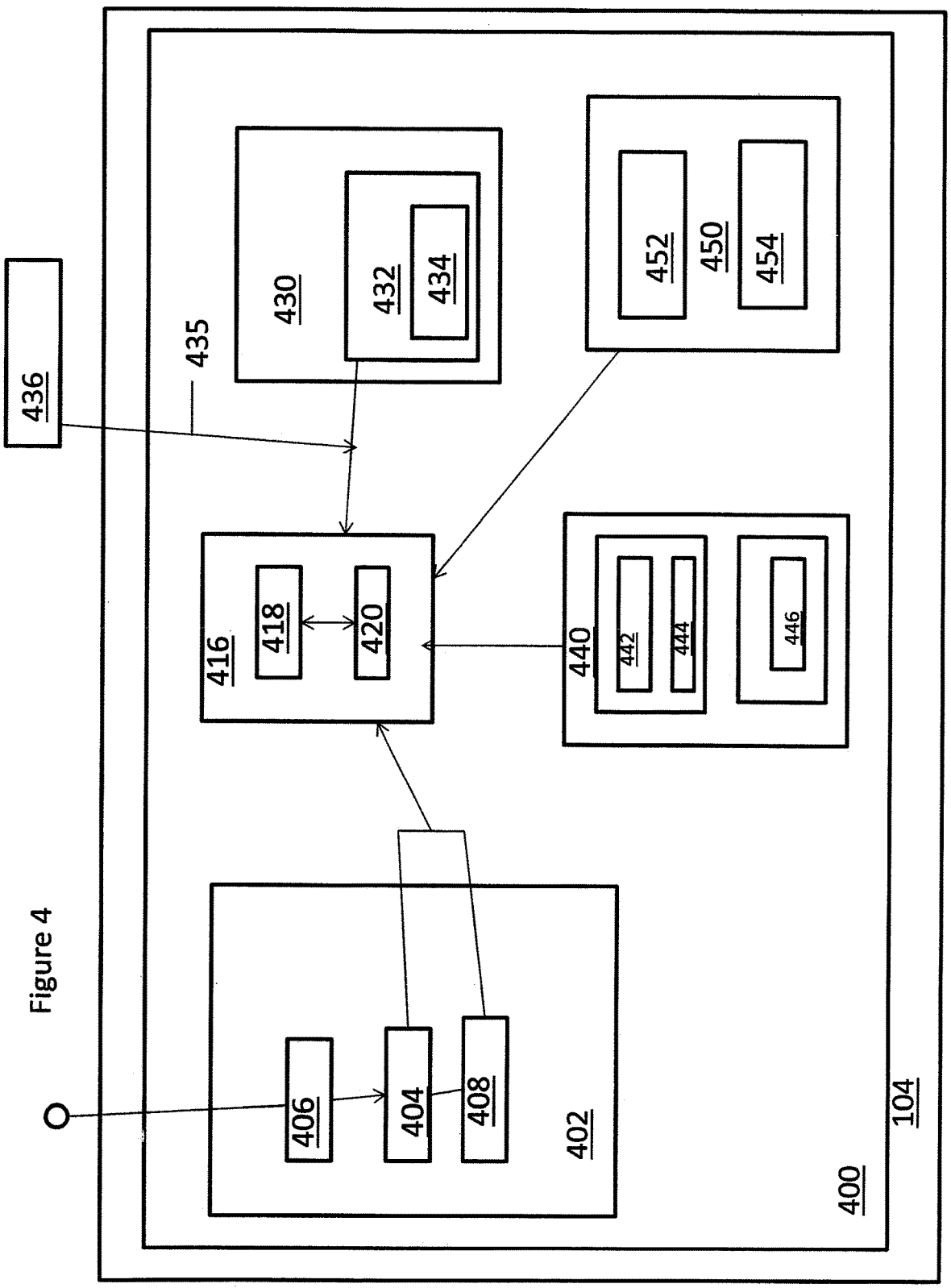
FIG. 4 illustrates an exemplary navigation system 400 incorporating the system 100 illustrated in FIG. 1.

The method and system described above may be incorporated into a navgiation system 400 as is illustrated in FIG. 4. According to certain embodiments of the invention, the navigation system 400 is incorporated into a vehicle 104. The navigation system 400 is a combination of hardware and software components. The navigation system 400 includes positioning system hardware 402. According to certain embodiments of the invention, the positioning system hardware 402 includes a global positioning system (GPS) 404. Additionally, the positioning system hardware 412 may include an antenna 406 and one or more sensors 408 (e.g., vehicle speed sensors, location sensors, direction sensors, compass, etc.).

The navigation system 400 also includes computer hardware 416. The computer hardware 416 includes a typical computer hardware configuration, which may be incorporated into the vehicle. The computer hardware 416 includes a computer processing unit (CPU) 418 and memory (e.g., RAM) 420.

The navigation system uses geographic data 434 stored in a storage media 432. This storage media 432 may be installed in a drive 430 in the vehicle naviagation system 400. Alternatively, this storage media may include, for example, a RAM contained within the CPU, as represented by the fast-access storage for example. Alternatively, the data may be contained in another storage media, such as a magnetic data storage diskette, compact disc, or other removable storage media/device, directly or indirectly accessible by the CPU 418. Additionally, the geographic data 434 may be stored in a remote server 436. In this case, the navigation system 400 is able to communicate with the remote server 434 through a wireless communication system 435.

The software components of the navigation, which may include navigation programming 452, may be stored in a non-volatile memory 450. Alternatively, the navigation programming 452 may be stored in the storage media 432. Additionally, program parameters and/or user profile information 454 may be stored along with the navigation programming 452.

The navigation system 400 also includes a user interface 440 for providing information to the user (e.g., vehicle driver, vehicle passenger, etc.) and for receiving user input. The user interface 440 includes both input devices, which may include, for example, a key pad 446, and output devices, which may include, for example, a display 442 (e.g., a visual display screen) and a speaker 444. The display 442 may include a standard display screen or touch-based interactive screen.

Additionally, a different aspect of the invention includes a computer-implemented method for performing at least certain steps in the above described method (e.g., see FIG. 2). Such a method may be implemented, for example, by operating a computer, as embodied by a digital data processing apparatus, to execute a sequence of machine-readable instructions. This computer may include the computer hardware 416 of the navigation system. Alternatively, it may include another computer hardware configuration in the vehicle or may be provided remotely. Instructions for performing the steps in the method may reside in various types of storage media. Thus, this aspect of the present invention is directed to a programmed product, including storage media (or a storage device) tangibly embodying a program of machine-readable instructions executable by a digital data processor to perform the above method.

This storage media may include, for example, a RAM contained within the CPU, as represented by the fast-access storage for example. Alternatively, the instructions may be contained in another storage media, such as a magnetic data storage diskette, compact disc, or other removable storage media/device, directly or indirectly accessible by the CPU. This storage media may include the storage media 432 provided in the navigation system 400 or other storage media, which may be implemented remotely through the remote server 436 or through the drive 430. Additionally, the instructions with respect to the above described method may be stored in the nonvolatile memory 450 of the navigation system 400.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system, comprising:
a central database storing personalized content of a user, the personalized content including geo-tagged pictures and content regarding locations, said content including user-created content and third-party-created content;
a portal for accessing and manipulating the personalized content on the central database;
a remote user device having a user interface through which the user accesses the personalized content;
an in-vehicle navigation system of a vehicle configured to receive the personalized content from the central database, the navigation system configured to automatically establish a connection with the user, through the portal, when the vehicle starts; and
a display, embodied in the in-vehicle navigation system, for displaying route guidance information on a map and to display the personalized content on the map,
wherein the user device is remote from the in-vehicle navigation system, wherein the distinct layers are displayed to the user in a list on a menu, wherein the user is able to enable or disable layers of the personalized content listed on the menu, wherein when a layer of the personalized content is enabled, the in-vehicle navigation system is configured to perform periodic queries to the central database to request content related only to the enabled personalized content and when a layer of the personalized content is disabled, the disabled personalized content is not displayed on the in-vehicle navigation system, wherein the enabled personalized content is displayed on the in-vehicle navigation system even if a route guidance feature of the in-vehicle navigation system is not in use, wherein said periodic queries include generating a bounding box indicating an area of interest for the personalized content, the bounding box representing a visible map area on a map screen of the in-vehicle navigation system or a route to a destination, wherein the portal is configured to maintain the personalized content in distinct keyhole markup language (KML) layers, wherein the system is configured to maintain different levels of detail for the personalized content depending on a size of a visible area of a screen of the in-vehicle navigation system, and wherein the personalized content comprises user-customizable status information for a point of interest.

2. The system according to claim 1, wherein the central database is stored on a server that is remote from a vehicle on which the in-vehicle navigation system is located.

3. The system according to claim 2, wherein the server comprises an original equipment manufacturer or corporate server.

4. The system according to claim 2, wherein the server is configured to receive point of interest information.

5. The system according to claim 1, wherein the user has an account on the portal.

6. The system according to claim 1, wherein the user uploads the personalized content onto the central database using the user device.

7. The system according to claim 1, wherein the portal is configured to receive the personalized content from the user in layers.

8. The system according to claim 1, wherein the portal comprises a web-based user interface.

9. The system according to claim 1, wherein the system is configured to allow the user to control a context and behavior of how the personalized content is displayed based on vehicle sensors, geo-position, or a number of vehicle occupants.

10. The system according to claim 1, wherein the personalized content further comprises user preferences.

11. The system according to claim 1, wherein a user is able to remotely enter a location on the remote user device and then transfer the location and personalized content to the in-vehicle navigation system from the remote user device through the portal.

12. The system according to claim 1 wherein the user is able to enable or disable display of each of the distinct layers on the map.

13. The system according to claim 1, wherein the personalized content further comprises content from social networks.

14. A method, comprising:

sending a request, from an in-vehicle navigation system of a vehicle to a remote server, for personal content of a user, the personal content including geo-tagged pictures and content regarding locations, said content including user-created content and third-party-created content, the navigation system configured to automatically establish a connection with the user when the vehicle starts;

accessing the personal content using a remote user interface device; and displaying, on a display screen embodied within the vehicle navigation system, route guidance information and the personal content on a display of the vehicle navigation system, wherein the user device is remote from the in-vehicle navigation system, wherein the personalized content is stored in distinct keyhole markup language (KML) layers, wherein the distinct layers are displayed to the user in a list on a menu, wherein the user is able to enable or disable layers of the personalized content listed on the menu, wherein when a layer of the personalized content is enabled, the in-vehicle navigation system is configured to perform periodic queries to the remote server to request content related only to the enabled personalized content and when a layer of the personalized content is disabled, the disabled personalized content is not displayed on the in-vehicle navigation system, wherein the enabled personalized content is displayed on the in-vehicle navigation system even if a route guidance feature of the in-vehicle navigation system is not in use, wherein said periodic queries include generating a bounding box indicating an area of interest for the personalized content, the bounding box representing a visible map area on a map screen of the in-vehicle navigation system or a route to a destination, wherein different levels of detail for the personalized content are maintained depending on a size of a visible area of a screen of the in-vehicle navigation system, and wherein the personalized content comprises user-customizable status information for a point of interest.

15. The method according to claim 14, further comprising, upon starting the in-vehicle navigation system, automatically establishing a user content session.

16. The method according to claim 15, wherein said sending a request for personal content comprises sending a request for a list of personal content stored in the remote server, and wherein, upon receiving said list, the method further comprising displaying said list to the user.

17. The method according to claim 16, further comprising determining which of said personal content on said list is to be enabled.

18. The method according to claim 16, further comprising, for said personal content on said list that is to be enabled:

performing a query to obtain layers of said personal content; and displaying said layers of said personal content on the display of the in-vehicle navigation system.

19. A method, comprising:

entering personalized content into a user account in a central database, the personalized content including geo-tagged pictures and content regarding locations, said content including user-created content and third-party-created content;

accessing the personalized content using a remote user interface device;

importing the personalized content from the central database to an in-vehicle navigation system of a vehicle, the navigation system configured to automatically establish a connection with the user when the vehicle starts; and displaying, on a display screen embodied within the vehicle navigation system, route guidance information and the personalized content on a map of the in-vehicle navigation system, wherein the user device is remote from the in-vehicle navigation system, wherein the distinct layers are displayed to the user in a list on a menu, wherein the user is able to enable or disable layers of the personalized content listed on the menu, wherein when a layer of the personalized content is enabled, the in-vehicle navigation system is configured to perform periodic queries to the central database to request content related only to the enabled personalized content and when a layer of the personalized content is disabled, the disabled personalized content is not displayed on the in-vehicle navigation system, wherein the enabled personalized content is displayed on the in-vehicle navigation system even if a route guidance feature of the in-vehicle navigation system is not in use, wherein said periodic queries include generating a bounding box indicating an area of interest for the personalized content, the bounding box representing a visible map area on a map screen of the in-vehicle navigation system or a route to a destination, wherein the personalized content is maintained in distinct keyhole markup language (KML) layers, wherein different levels of detail for the personalized content are maintained depending on a size of a visible area of a screen of the in-vehicle navigation system, and wherein the personalized content comprises user-customizable status information for a point of interest.

20. The method according to claim 19, further comprising accessing and manipulating the personalized content through a user interface portal.

\* \* \* \* \*